(12) United States Patent
Segal et al.

(10) Patent No.: US 12,012,218 B2
(45) Date of Patent: Jun. 18, 2024

(54) EMBEDDED DISPLAY AUTOMATIC FLIGHT CONTROLS DISTRIBUTED ARCHITECTURE

(71) Applicant: Rockwell Collins, Inc., Cedar Rapids, IA (US)

(72) Inventors: Juan Segal, Cedar Rapids, IA (US); Charles Steffen, Hiawatha, IA (US); John P. Perich, Duluth, MN (US); Jason K. Dahlstrom, Marion, IA (US); Thomas M. Scanlon, Cedar Rapids, IA (US); Ajay Karthik Ganesan, Coralville, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 318 days.

(21) Appl. No.: 17/521,439

(22) Filed: Nov. 8, 2021

(65) Prior Publication Data
US 2023/0145181 A1 May 11, 2023

(51) Int. Cl.
*B64D 43/02* (2006.01)
*G05D 1/00* (2006.01)
*G05D 1/10* (2006.01)
*G07C 5/08* (2006.01)

(52) U.S. Cl.
CPC ............ *B64D 43/02* (2013.01); *G05D 1/101* (2013.01); *G07C 5/0808* (2013.01)

(58) Field of Classification Search
CPC ........ B64D 43/02; B64D 45/00; G05D 1/101; G07C 5/0808; G08G 5/0021; G08G 5/0052; G01C 23/00
See application file for complete search history.

(56) References Cited

U.S. PATENT DOCUMENTS

| | | | |
|---|---|---|---|
| 5,778,203 A | * | 7/1998 | Birkedahl ............... H04L 12/40 701/14 |
| 8,020,113 B2 | | 9/2011 | Cabaret et al. |
| 8,683,105 B1 | | 3/2014 | Shultz et al. |
| 8,743,020 B1 | | 6/2014 | Mazuk et al. |
| 8,914,165 B2 | | 12/2014 | Noll et al. |
| 9,137,038 B1 | | 9/2015 | Mazuk et al. |

(Continued)

OTHER PUBLICATIONS

Extended European Search Report dated Mar. 31, 2023; European Application No. 22206218.4.

*Primary Examiner* — Rodney A Butler
(74) *Attorney, Agent, or Firm* — Suiter Swantz IP (57) ABSTRACT

A flight display is described. The flight display includes a display screen, a physical network interface, and multiple processors. The flight display interfaces with the flight deck by way of the physical network interface. The display screen displays images representative of avionics data in response to signals generated by one or more of the processors. The processors also generate command signals causing an actuator of the aircraft to control a flight control surface or a throttle. In this regard, the one or more of the processors perform various automatic flight control system (AFCS) functions. A system is further described including multiple of the flight displays. By hosting the AFCS functions across processors of the multiple flight displays, a level of command integrity may be reached. Furthermore, backups flight displays are available to be reconfigured to perform the AFCS functions.

14 Claims, 9 Drawing Sheets

(56) References Cited

U.S. PATENT DOCUMENTS

| | | | |
|---|---|---|---|
| 9,567,098 B2 | 2/2017 | Kou et al. |
| 10,144,529 B1 | 12/2018 | Fetta et al. |
| 10,430,139 B2 | 10/2019 | Hill |
| 10,850,864 B2 | 12/2020 | Lyons et al. |
| 10,891,921 B2 | 1/2021 | Mittal et al. |
| 2007/0016344 A1 | 1/2007 | Stefani |
| 2012/0280986 A1 | 11/2012 | Chabot et al. |
| 2013/0076540 A1 | 3/2013 | McLoughlin et al. |
| 2016/0188765 A1 | 6/2016 | Vossler et al. |
| 2020/0192560 A1 | 6/2020 | Wyatt et al. |
| 2021/0001997 A1 | 1/2021 | Eltohamy et al. |

\* cited by examiner

EMBEDDED DISPLAY AUTOMATIC FLIGHT CONTROLS DISTRIBUTED ARCHITECTURE

TECHNICAL FIELD

The present invention generally relates to avionics aircraft controls systems, and more particularly to architectures for Automatic Flight Control Systems.

BACKGROUND

Prior designs for Automatic Flight Control Systems relied upon multiplexing Flight Control functions in a common processor. Furthermore, prior designs for Automatic Flight Control Systems used processing resources housed in an Integrated Processing Computer (IPC) cabinet and/or in a Data Concentrator Unit (DCU) Module Cabinet (DMC). Such prior designs may require various cabinetry to host the functions, raising to size and weight considerations. Therefore, it would be advantageous to provide one or more of a device, system, or method that cures the shortcomings described above.

SUMMARY

Embodiments of the present disclosure are directed to a flight display. In one embodiment, the flight display includes a display screen configured to display a plurality of images representing avionics data. In another embodiment, the flight display includes a physical network interface. In another embodiment, the flight display includes a plurality of processors communicatively coupled by an inter-processor communication bus. In another embodiment, one of the plurality of processors receives the avionics data and executes a display function causing the display screen to display the plurality of images. In another embodiment, at least some of the plurality of processors execute a plurality of automatic flight control system functions causing the flight display to send a command by way of the physical network interface. In another embodiment, each of the at least some of the plurality separately execute at least one of the plurality of automatic flight control system functions. In another embodiment, the flight display is a line replaceable unit configured to interface with a flight deck of an aircraft by the physical network interface. In another embodiment, the command causes at least one actuator communicatively coupled to the flight display by way of the physical network interface to adjust at least one of a flight control surface or a throttle of the aircraft.

Embodiments of the present disclosure are also directed to an automatic flight control system of an aircraft. In one embodiment, the automatic flight control system includes at least two flight displays. In another embodiment, the at least two flight displays are each a line replaceable unit configured to interface with a flight deck of the aircraft by a physical network interface. In another embodiment, each of the at least two flight displays include a display screen configured to display a plurality of images representing avionics data. In another embodiment, each of the at least two flight displays include a physical network interface. In another embodiment, each of the at least two flight displays include a plurality of processors communicatively coupled by an inter-processor communication bus. In another embodiment, one of the plurality of processors receives the avionics data and executes a display function causing the display screen to display the plurality of images. In another embodiment, at least some of the plurality of processors execute a plurality of automatic flight control system functions causing the flight display to send a command by way of the physical network interface. In another embodiment, each of the at least some of the plurality of processors separately execute at least one of the plurality of automatic flight control system functions. In another embodiment, the commands from the at least two flight displays cause at least one actuator communicatively coupled to the at least two flight displays by way of the physical network interfaces to adjust at least one of a flight control surface or a throttle of the aircraft.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive "or". For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

An automatic flight control system (AFCS) function may be executed by one or more processors based on one or more of avionics data, a desired level of integrity, or a desired redundancy. The execution of AFCS functions may generate command outputs. The command outputs may drive various actuators which are downstream of the AFCS functions. A minimum set of command outputs (i.e., instances of the functions) may be needed to cause the actuator to adjust a flight control surface or a throttle, due to various mandated safety requirements. Embodiments of the present disclosure are generally directed to executing the AFCS functions by a flight display integrated into a flight deck of an aircraft as a line-replaceable unit (LRU). The flight display may include processors which execute various avionics functions, including the AFCS functions. In this regard, the flight display may also be referred to as an Embedded Display System (EDS). Multiple of the flight displays may be communicatively coupled to form an Automatic Flight Control System (AFCS). In this regard, each of the flight displays may host the AFCS functions to provide a desired level of integrity and/or redundancy. Furthermore, various flight displays may be considered back-up displays, which are reconfigured to perform the AFCS functions upon detecting one or more of a failure or a power-off of the flight displays currently performing the AFCS functions. The system thus provides flexibility in availability and integrity of AFCS functions. In this regard, the system may implement an architecture using two or more Embedded LRU displays. Such architecture may by scalable based on the number of displays within the flight deck.

Figure 1A:
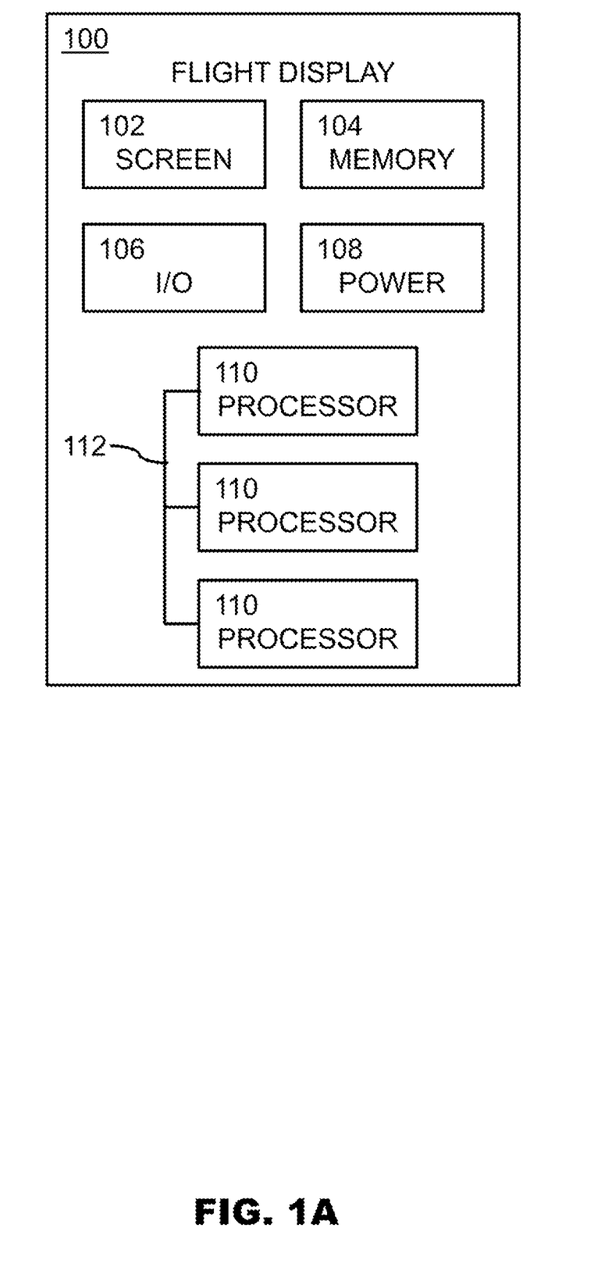
FIG. 1A depicts a simplified control diagram of a flight display, in accordance with one or more embodiments of the present disclosure.
Figure 1B:
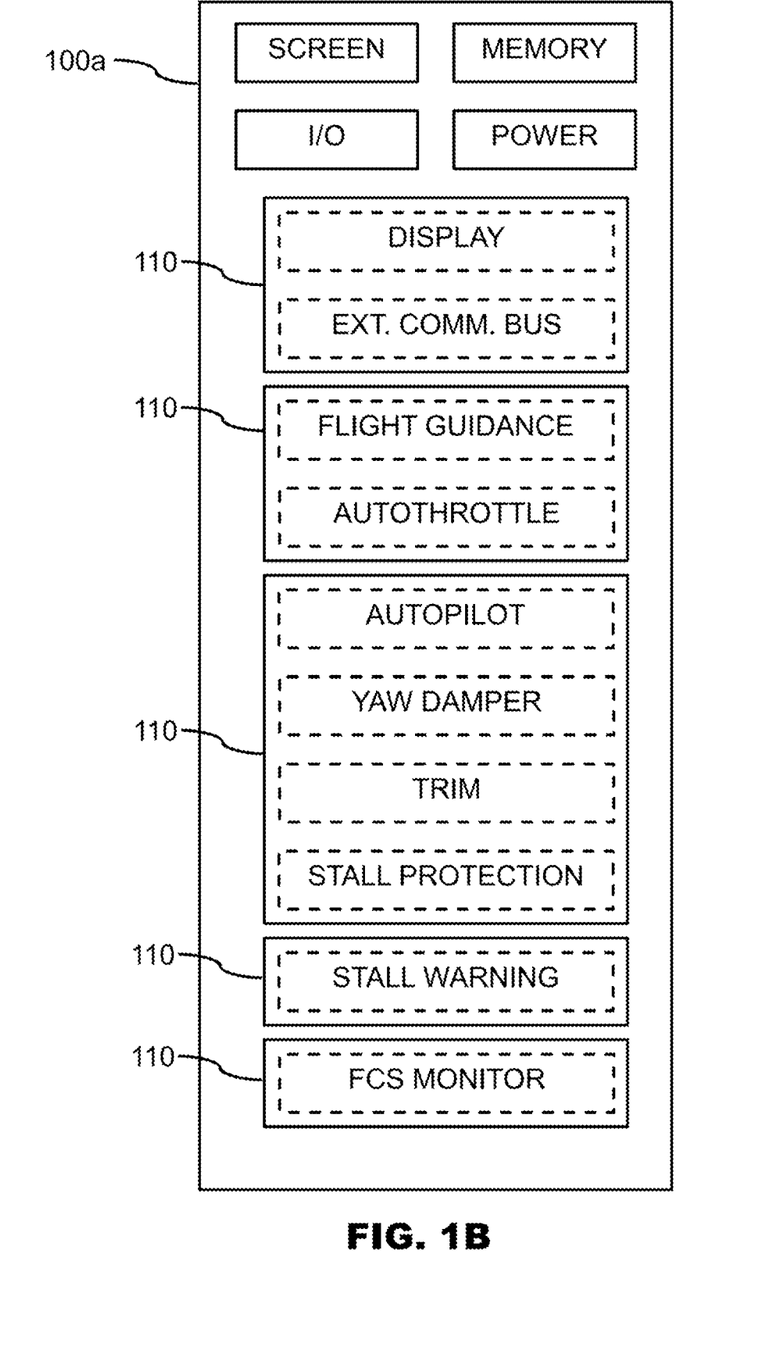
FIG. 1B depicts a simplified control diagram showing functions executed by processors of a flight display including five processors executing the functions, in accordance with one or more embodiments of the present disclosure.
Figure 1C:
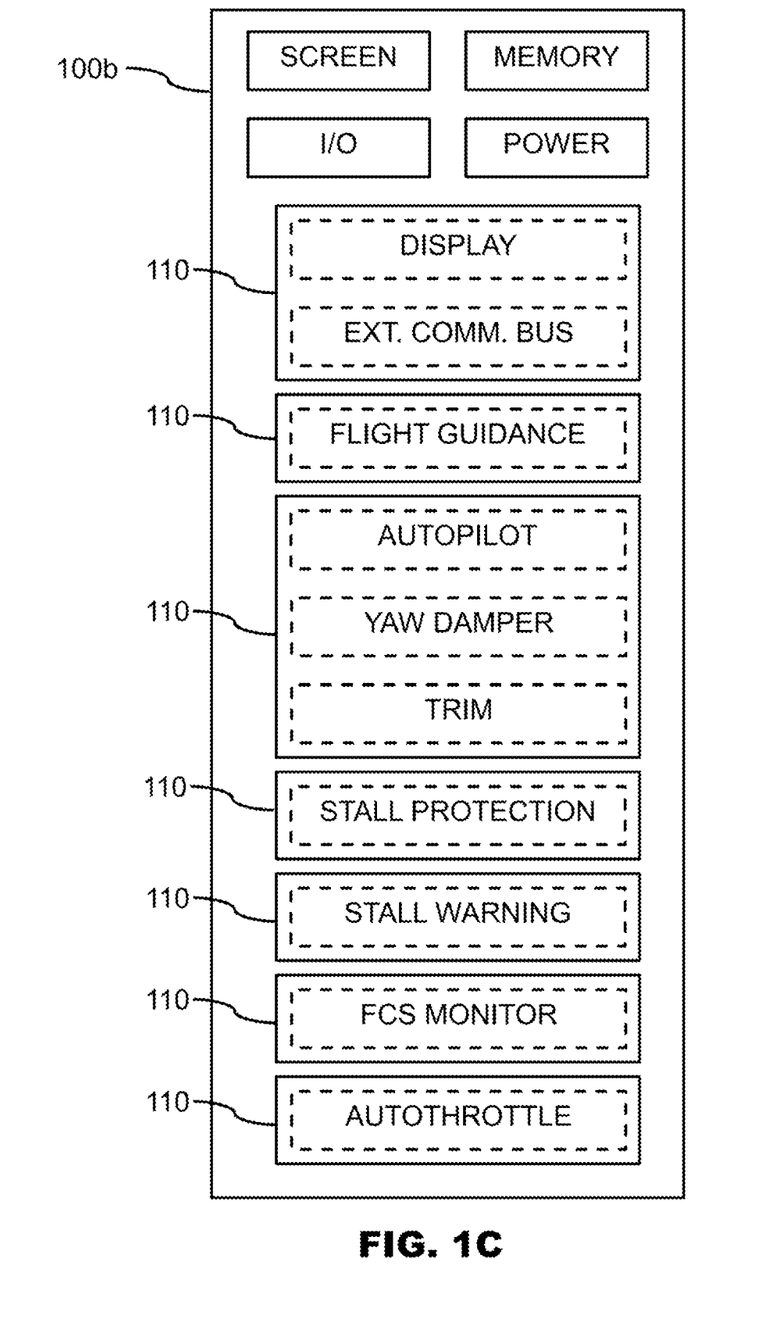
FIG. 1C depicts a simplified control diagram showing functions executed by processors of a flight display including seven processors executing the functions, in accordance with one or more embodiments of the present disclosure.

Referring now to FIGS. 1A-1C, a flight display 100 is described, in accordance with one or more embodiments of the present disclosure. The flight display 100 may be configured to function as one or more of a primary flight display (PFD) or a multifunction display (MFD). Such PFD and MFDs may be mounted in front of both a pilot and a copilot. The MFD may be mounted between the PFD of the pilot and the PFD of the copilot. To allow for the failure of either the PFD or the MFD, the flight display 100 may be capable of being configured between PFD and MFD formats. Thus, the flight display 100 may provide instrumentation for the operation of an aircraft. The flight display may include one or more integrated components, such as, but not limited to, screen 102, a memory 104, a physical network interface 106, a power supply 108, and one or more processors 110. In this regard, the flight display 100 may be considered an Embedded Display System (EDS) which may be installed within a flight deck as a line-replaceable unit. It is noted herein that the one or more components of the flight display 100 may be communicatively coupled to the various other components of the flight display 100 in any manner known in the art. For example, the processor(s) 110 may be communicatively coupled to other components (e.g., screen 102, a memory 104, a physical network interface 106, a power supply 108, and the like) by a physical connection (not depicted). The flight display 100 may further comply with various Aeronautical Radio Inc. (ARINC) standards, such as, but not limited to ARINC 661.

The screen 102 of the flight display 100 may include any screen known in the art. For example, the screen 102 may include, but is not limited to, a liquid crystal display (LCD). The screen are not limited to LCD devices as it is contemplated additional display technologies (e.g., OLED) may be suitable for implementation in the present invention. The screen 102 may be implemented using any of a variety of display technologies, including CRT, LCD, organic LED, dot matrix display, and others. The screen 102 may further display various images generated by the processor(s) 110. The images shown on the screen 102 may include monochrome or color graphical representations of various avionics data, such as, but not limited to, an indication of altitude of other aircraft, weather conditions, terrain, the altitude and/or location of such information relative to the aircraft, and so on. In some embodiments, the screen may further include a touch screen. For example, the screen 102 may include a capacitive touchscreen, a resistive touchscreen, or another touchscreen known in the art.

The memory 104 of the flight display 100 may include any storage medium known in the art. For example, the memory 104 may include a non-transitory memory medium. For instance, the memory 104 may include, but is not limited to, a read-only memory (ROM), a random-access memory (RAM), a magnetic or optical memory device (e.g., disk), a solid-state drive and the like. It is further noted that memory 104 may be housed in a common controller housing with the one or more processor(s) 110. In an alternative embodiment, the memory 104 may be located remotely with respect to the physical location of the processor 110. In another embodiment, the memory 104 maintains program instructions for causing the processor(s) 110 to carry out the various steps described through the present disclosure.

The physical network interface 106 (also referred to as input/output (I/O)) of the flight display 100 may allow the flight display 100 to interface with a flight deck of an aircraft. In this regard, the physical network interface 106 may include any standard interface, such as, but not limited to, ARINC 429, ARINC-664, ethernet, AFDX, serial, CAN, TTP, Military Standard (MIL-STD) 1553, peripheral component interconnect (PCI) express, digital interfaces, analog interfaces, discrete interfaces, or the like. The physical network interface 106 may be configured to receive data from various sensors and/or user interfaces of the aircraft. The physical network interface 106 may also be configured to send commands to various actuators of the aircraft. In this regard, various inputs and outputs may be received and sent by the flight display 100.

The power supply 108 of the flight display 100 may include any suitable power supply known in the art. In this regard, any distributed or local power supply that provides conditioned power suitable for implementation in the context of avionics (e.g., 28 VDC) capable of meeting the requirements of the flight display may be implemented.

The processors 110 of the flight display 100 may include any processing unit known in the art. For example, the processors 110 may include a multi-core processor, a single-core processor, a reconfigurable logic device (e.g., FPGAs), a digital signal processor (DSP), a special purpose logic device (e.g., ASICs)), or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) 110 may include any microprocessor-type device configured to execute software algorithms and/or instructions. In general, the term "processor" may be broadly defined to encompass any device having one or more processing elements, which execute program instructions from memory 104, from firmware, or by hardware implemented functions. It should be recognized that the steps described throughout the present disclosure may be carried out by the processors 110.

The processors 110 may also be communicatively coupled by an inter-processor communication bus 112. The inter-processor communication bus 112 may allow the processors 110 to pass various information. The inter-processor communication bus 112 may include any inter-processor communication bus known in the art.

One or more of the processors 110 may run one or more operating systems. The operating system may include any operating system known in the art. The operating system may act as a kernel between the various hardware components and the software functions further described herein. In some embodiments, the operating system may partition applications or functions by time division multiplexing or other suitable process. In this regard, resources may be guaranteed for the various functions.

The processors 110 may execute various functions. For example, one or more of the processors 110 may execute a display function causing the screen 102 to display the images. The display function may include any display function known in the art, such as displaying various avionics data. By way of another example, one or more of the processors 110 may execute an external communication bus function. The external communication bus function may cause the flight display 100 to handle signals received from the physical network interface 106 and further send various signals by way of the physical network interface 106. The external communication bus function may include any external communication bus function known in the art. In some embodiments, a first processor executes both the display function and the external communication bus function.

According to various exemplary embodiments of the inventive concepts disclosed herein, the flight display 100 may also provide automatic flight control system (AFCS) functionality.

The processors 110 may execute one or more automatic flight control system (AFCS) functions. The AFCS functions may receive various sensor data and aircraft configuration data (e.g., by way of the physical network interface 106) as inputs. Such received data may include, but is not limited to, data from navigation sensor data, attitude sensor data, air data sensor data, aircraft configuration data, or other flight control input data known in the art. The AFCS functions may further cause the flight display 100 to send one or more commands by way of the physical network interface 106. The commands may cause actuators which are communicatively coupled to the flight display 100 (e.g., by way of the physical network interface 106 and various other networks) to adjust a flight control surface or a throttle of the aircraft. The signals may control a servo connected to a control cable for directly adjusting the flight control surface or controlling an actuator (e.g., hydraulic actuator) coupled to the flight control surface. The signals may also be transmitted to a fly-by-wire system, which in turn moves the flight surfaces using an interfaces with the aircraft actuators. The signals may also control a servo that moves a column or wheel of the aircraft, with such movement then being sensed by a fly-by-wire system which transmits a signal to command the actuator to adjust the flight control surface. The command may be provided to the actuator by a direct connect or a data concentration (i.e., routed through a different box). Such actuators may include any actuator known in the art. Similarly, such flight control surfaces may include any flight control surface known in the art, such as, but not limited to, an elevator, an aileron, a rudder, or a trim.

It is contemplated that by hosting the AFCS functions on the processors 110 within the flight display 100, no IMA cabinet may be required to perform said AFCS functions. This may be advantageous in implementing AFCS functions in an aircraft which otherwise does not include sufficient cabinet space and/or for reducing a weight or cost of the aircraft. Furthermore, as the number of displays housed within the aircraft increases, an integrity and availability of the AFCS functions may similarly increase. It is further contemplated that one or more IMA cabinets and/or an additional flight display may host the AFCS functions in tandem with the flight display 100.

One or more automatic flight control system (AFCS) functions are now described. The AFCS functions may include a flight guidance (FG) function. The flight guidance function may provide an outer loop that converts position error into one or more of an attitude or an attitude error command. The attitude or attitude error command may further be provided for use by an autopilot function. The AFCS functions may also include an autopilot (AP) function. The autopilot function may provide aircraft stability and control, while at the same time, process the attitude or attitude error command from the flight guidance function to position the aircraft as desired. The AFCS functions may also include a yaw damper (YD) function. The yaw damper function may provide yaw axis control for stability of Dutch Roll and turn coordination. The AFCS functions may also include a trim function. The trim function may provide control of secondary systems to alleviate forces on a control column in one or more axes of control. The AFCS functions may also include an auto-throttle (AT) function. The auto-throttle function may control aircraft engines either directly or indirectly via the engine throttles, to maintain aircraft speed or thrust. The AFCS functions may also include a flight control system (FCS) monitor function. The monitor function may provide independent safety and design assurance over safety critical functions, such as, but not limited to, the autopilot function, the yaw damper function, the trim function, and/or the auto-throttle function. The AFCS functions may also include a stall warning (SW) function. The stall warning function may detect an impending stall condition. The AFCS functions may also include a stall protection function. The stall protection function may actively force the aircraft out of a potential stall condition. The AFCS functions may include various additional or alternative functions as known in the art of flight control.

In some embodiments, a signal may be received by way of the physical network interface. The received signal may indicate a failure or a power-off of another component of the aircraft (e.g., a second flight display or an IMA cabinet). One or more of the processors 110 may detect the failure or power-off based on the received signal. One or more of the processors 110 may further be reconfigured in response to the detection. In this regard, the functions executed by the processors 110 may be dynamically reconfigurable. The processors 110 may reconfigure the images displayed on the screen 102. For example, where the flight display 100 is a multi-function display, the images may be reconfigured to display primary flight display imagery, in response to detecting failure of one of the primary flight displays. The processors 110 may also be reconfigured to execute the AFCS functions. For example, the processors 110 may be reconfigured to execute the AFCS functions, such that the flight display 100 may be considered a secondary AFCS function host (i.e., in the event of a primary AFCS function host) or a tertiary AFCS function host (i.e., in the event of failure of power-off of a secondary AFCS function host). Such reconfiguration may cause the flight display 100 to operate in a fail-operational configuration, where each of the AFCS functions is fully operational even upon failure of the primary or secondary function host. It is further contemplated that the flight display 100 may be considered the primary AFCS function host. By way of another example, the processors 110 may be reconfigured to provide the command outputs to the aircraft actuator based on the AFCS functions executed by the processors.

The flight display 100 may include a number of the processors 110 (e.g., between five and seven, or more). Parallel processing the AFCS functions among the processors 110 may raise various certification issues with flight authority. In some embodiments, each of the processors 110 execute separate AFCS functions, such that no AFCS function is parallelly processed and do not share processing resources for performing the AFCS functions. Various permutations of AFCS function allocation among the processors 110 may exist. Such allocations may be based on the number of processors 110 embedded within the flight display 100, various certification requirements, resource availability, or other suitable reasons. An exemplary permutation allocating the AFCS functions among five processors is depicted in FIG. 1B (see flight display 100a). An exemplary permutation allocating the AFCS functions among seven processors is depicted in FIG. 1C (see flight display 100b).

In some embodiments, one or more of the processors 110 may execute two or more AFCS functions. For example, one of the processors 110 may execute the autopilot function, the yaw damper function, and the trim function (See FIG. 1B). Said processor may further execute the stall protection function (See FIG. 1C). By way of another example, one of the processors 110 may execute the flight guidance function and the auto-throttle function (See FIG. 1B).

In some embodiments, one or more AFCS functions are hosted on separate processors from others of the AFCS functions. For example, the stall warning function may be executed by a separate processor than the stall protection function. By way of another example, the flight control system monitoring function may be executed by a separate processor from one or more of the autopilot function, the yaw damper function, the trim function, and the auto-throttle function. As may be understood, a number of the AFCS functions may be executed by separate processors.

Figure 2:
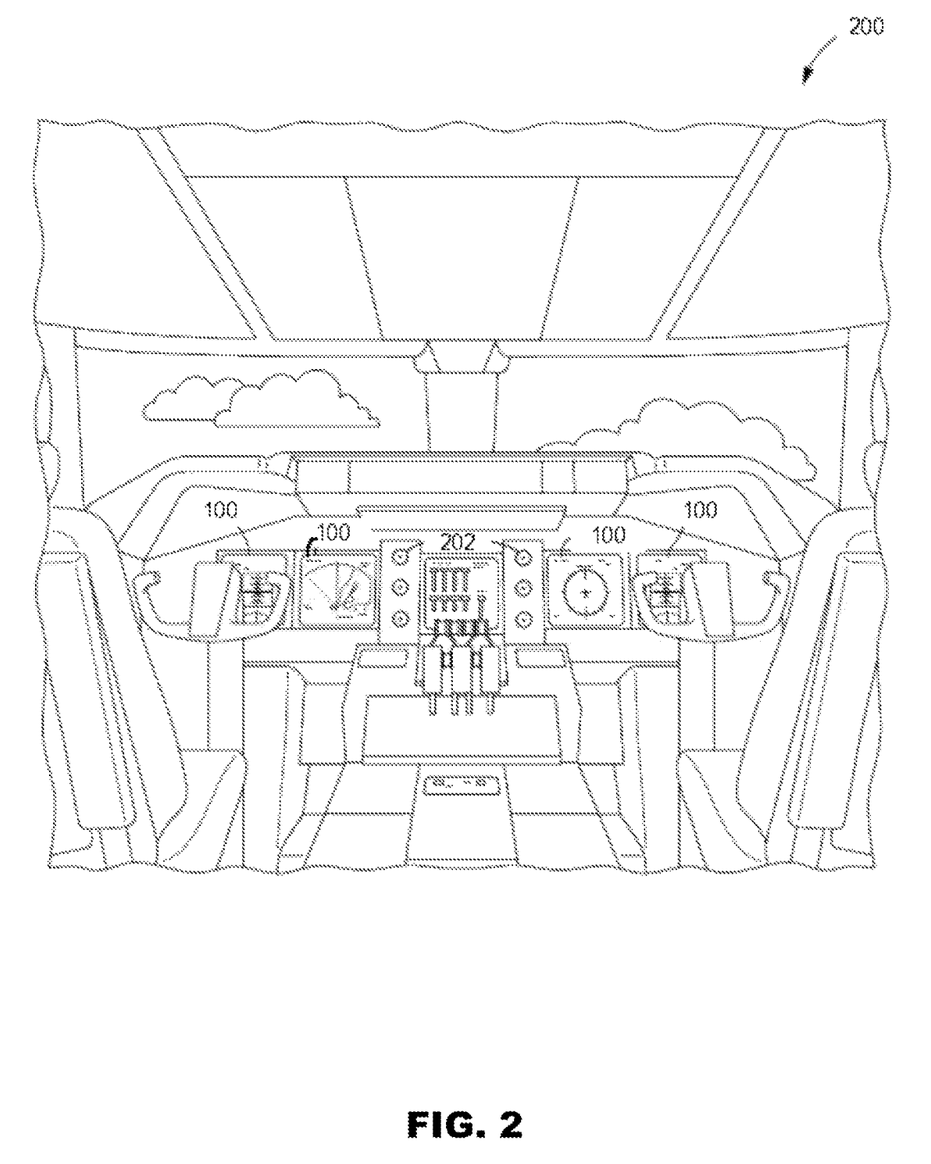
FIG. 2 depicts a perspective view of an exemplary flight deck of an aircraft including flight displays, in accordance with one or more embodiments of the present disclosure.

Referring now to FIGS. 2, a system 200 of an aircraft is described, in accordance with one or more embodiments of the present disclosure. The system 200 may be embodied as a cockpit of an aircraft. The system 200 may include one or more the flight displays 100 each being a line replaceable unit interfacing with a flight deck of the aircraft by the physical network interface 106. By executing the AFCS functions within the flight displays 100, the system 200 may be considered an automatic flight control system. The system 200 may provide a high level of integrity and availability for the AFCS functions. The flight displays 100 may further meet a design assurance such that no single point failure may result in loss of all AFCS functions.

The number of the flight displays 100 within the system 200 may be based on a configuration of the associated flight deck. For example, some cockpit configurations may include between two and six, or more flight displays 100. Commonly, three of the flight displays 100 may be provided within the flight deck (e.g., two PFDs and one MFD). A level of integrity and availability may increase as additional flight displays host the AFCS functions. In some instances, the flight deck may be reconfigurable. The flight displays 100 may handle the addition or removal of AFCS function hosts (e.g., additional fight displays or IMA cabinets) by receiving a signal by way of the physical network interface 106.

The system 200 may also include one or more user interface (UI) elements 202. The UI elements 202 may include, for example, dials, switches, buttons, touch screens, keyboards, a mouse, joysticks, cursor control devices (CCDs) or other multi-function key pads certified for use with avionics systems. The UI elements 202 may be configured to, for example, allow an aircraft crew member to interact with various avionics applications and perform functions such as data entry, manipulation of navigational maps, and moving among and selecting checklist items. For example, the UI elements 202 may be used to adjust features of the flight displays 100, such as contrast, brightness, width, and length. The UI elements 202 may also (or alternatively) be used by an aircraft crew member to interface with or manipulate the displays of the flight displays 100. For example, the UI elements 202 may be used by aircraft crew member to adjust the brightness, contrast, and information displayed on the flight displays 100. The UI elements 202 may additionally be used to acknowledge or dismiss an indicator provided by the flight displays 100. Further, the UI elements 202 may be used to correct errors on the flight displays 100. Other UI elements 202, such as indicator lights, displays, display elements, and audio alerting devices, may be configured to warn of potentially threatening conditions such as severe weather, terrain, and obstacles.

In some embodiments, the UI elements 202 include a flight control mode panel. The flight control mode panel may be communicatively coupled to the flight displays 100. The AFCS functions executed by the flight displays 100 may be reconfigurable based on a signal from the flight control mode panel. The flight control mode panel may further allow for selective engagement of the automatic flight control system functions, based on a control mode selected on the flight control mode panel. The flight control mode panel may include any number of control modes known in the art.

Figure 3A:
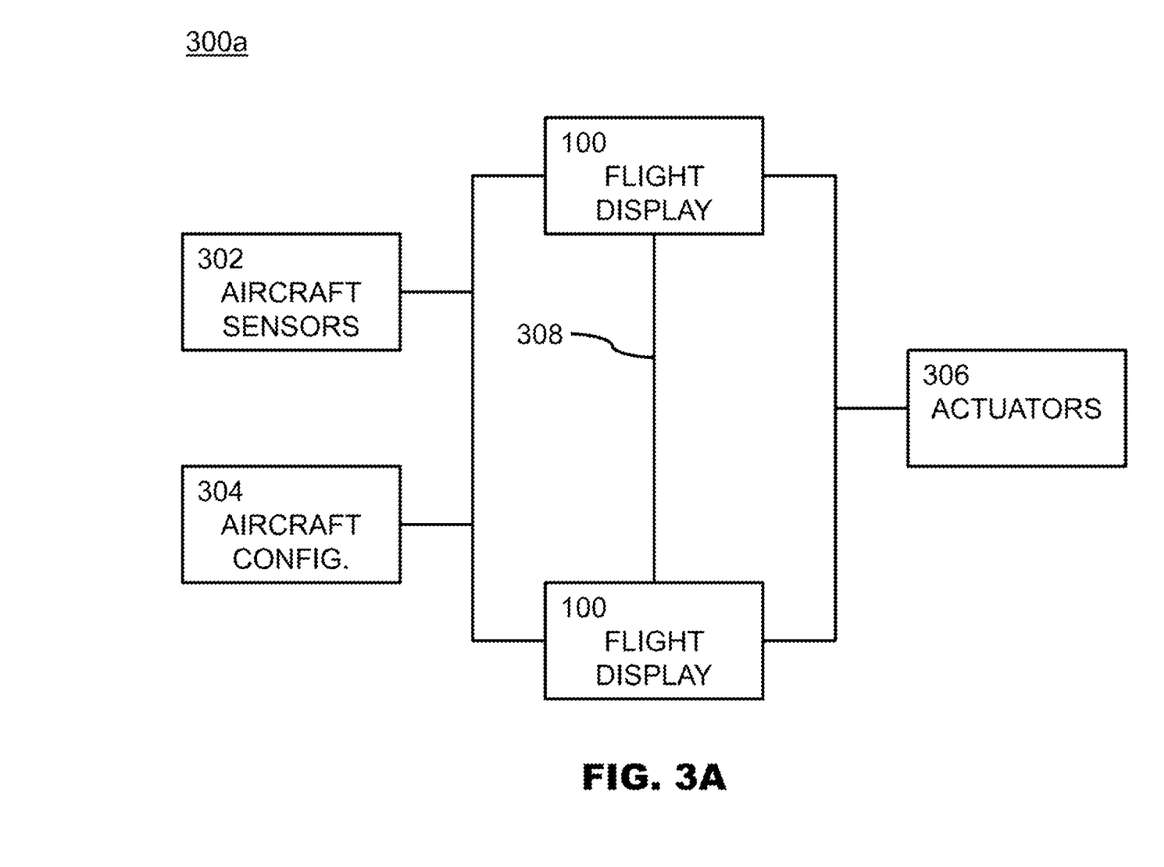
FIG. 3A depicts a simplified control diagram of an automatic flight control system with two flight displays, in accordance with one or more embodiments of the present disclosure.
Figure 3B:
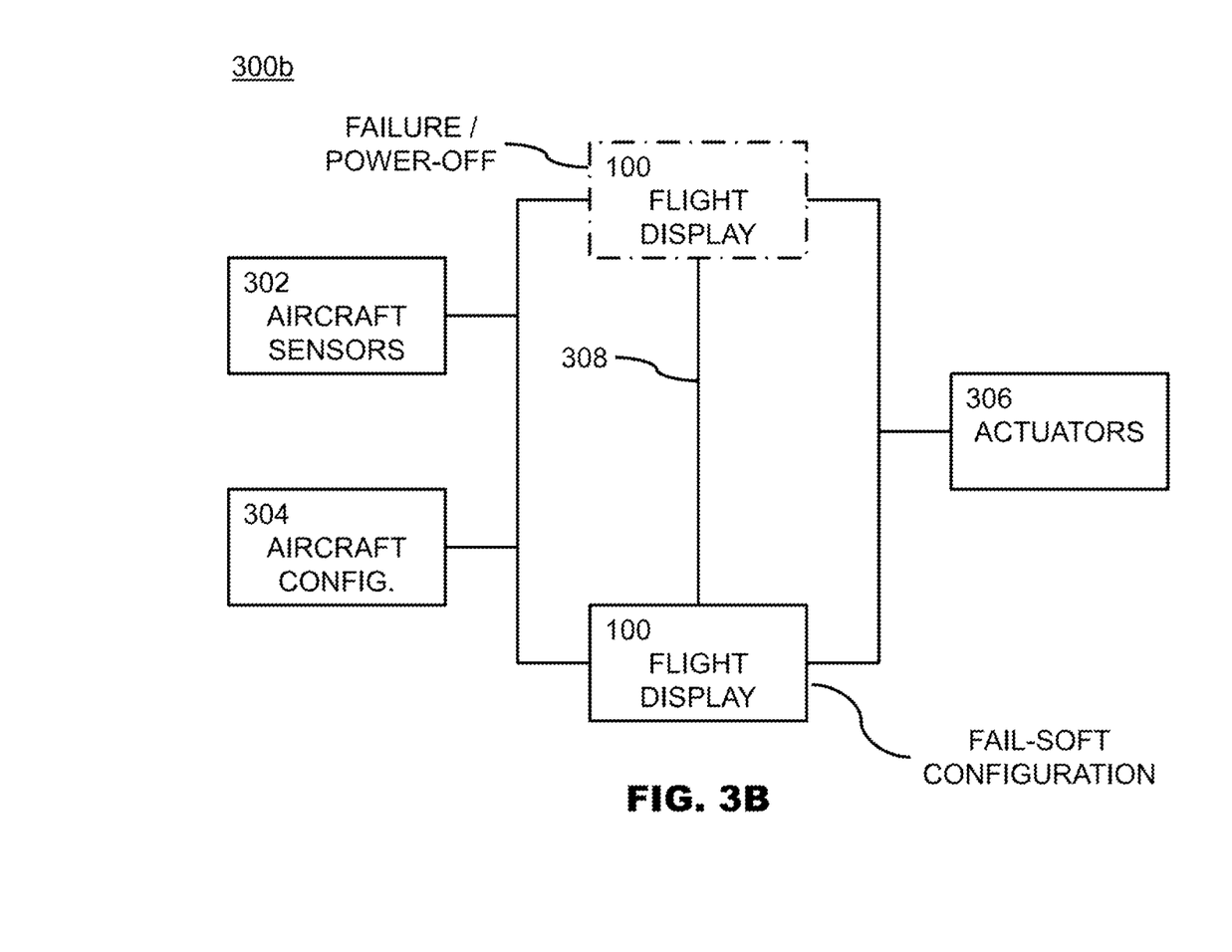
FIG. 3B depicts a simplified control diagram of an automatic flight control system with two flight displays where one of the two flight displays is operating in a fail-soft configuration upon detecting a failure or power-off of the other flight display, in accordance with one or more embodiments of the present disclosure.

Referring now to FIGS. 3A-3B, a system 300 (e.g., system 300a, system 300b) is described in accordance with one or more embodiments of the present disclosure. The system 300 may be similar to the system 200, with the exception that the system 300 includes two of the flight displays 100.

The system 300 may include two of the flight displays 100. The flight displays 100 may receive various data by way of the physical network interfaces 106 and various communication buses. The communication buses may include any communication bus known in the art.

The flight displays 100 may receive data from aircraft sensors 302. The aircraft sensors 302 may include, but are not limited to, navigation sensors, attitude sensors, and air data sensors. For example, the navigation sensors may include data from one or more of very high frequency omnidirectional range systems (VOR), instrument landing system (ILS), or global positioning systems (GPS) and the like. By way of another example, the attitude sensors may include one or more of attitude or inertial reference sensor values used to perform closed loop attitude stability and control of the aircraft. By way of another example, the air data sensors may include one or more of air data or angle of attack sensor data used in closed loop control or for further control loop closure.

The flight displays 100 may also receive aircraft configuration data 304. The aircraft configuration data 304 may be received by sensors which supply the aircraft configuration data and/or may be based on data stored in memory. The aircraft configuration data 304 may include, but is not limited to, flap position, spoiler position, gear position, weight on wheels, surface positions, trim position, engines, and the like. Although the aircraft sensors 302 and the aircraft configuration data 304 are each depicted by one block diagram, this is not intended as a limitation on the present disclosure. Commonly, aircraft sensors data and aircraft configuration data may be separated into various subsets (e.g., subsets based on the side of the aircraft, sensor type, etc.).

The system 300 may further include a communication bus 308. The communication bus 308 may communicatively couple the flight displays 100 (e.g., by way of the physical network interfaces 106). In this regard, the flight displays 100 may detect when one or more of the other flight displays has experienced a failure or a power-off. Optionally, the flight displays 100 may share the command outputs from the AFCS functions. In this regard, the flight displays 100 may receive the command outputs for comparison purposes (e.g., to determine agreement prior to controlling the actuator). The communication bus 308 may include any communication bus known in the art.

In some embodiments, a minimum set of command outputs (i.e., instances of the functions) may be needed to meet a mandated safety requirement. For example, one instance of the flight guidance function, the stall warning function, the monitoring function, and the auto-throttle function may be required to meet the safety requirement. By way of another example, two instances of the auto-pilot function, the yaw damper function, and the stall protection function may be required to meet the safety requirement. In this regard, the command outputs from the two instances of the auto-pilot function must be in agreement. Further instances of the functions may be provided to meet a desired level of redundancy. As depicted in FIG. 3A, the flight displays 100 may include processors which execute two instances of the AFCS functions. In this regard, the system 300a may meet the requirements for the auto-pilot functions, the yaw damper functions, and the stall protection functions.

The flight displays 100 may further send the commands output to one or more actuators 306. The actuators 306 may be communicatively coupled to the flight displays 100 by way of the physical network interface 106 and one or more communication buses. In some embodiments, the actuators 306 are in a direct connection with the flight displays 100. In other embodiments, the actuators 306 are further communicatively coupled by way of a data concentration unit (e.g., for comparing the commands). In response to receiving the commands, the actuators 306 may adjust a flight control surface or a throttle of the aircraft. The flight control surface may include any flight control surface known in the art, such as, but not limited to, an elevator, an aileron, a rudder, or a trim. Similarly, the actuator may include any actuator known in the art. Thus, the two flight displays may provide the two instances of autopilot, trim, stall Protection and yaw damper commands required to drive the downstream actuators.

In some embodiments, only one instance of the flight guidance function is hosted by the two flight displays 100. The one instance of the flight guidance function may be dynamically configured to the either of the flight displays (e.g., pilot or co-pilot side) depending on which flight display is currently in manual control.

Referring specifically now to FIG. 3B, a second of the flight displays 100 has failed or otherwise been powered-off. A first of the flight displays 100 may detect the failure or power-off of the second flight display. The first flight display may then be dynamically reconfigured into a fail-soft configuration upon detecting the failure or the power-off. In this regard, the actuator 306 may receive insufficient numbers of autopilot, trim, yaw damper, and stall protection commands. The active flight display may further reconfigure the AFCS functions. Optionally, the processors of the active flight display may continue to execute one or more of the flight guidance function, the stall warning function, the flight control system monitor function, or the auto-throttle function. Similarly, the processors of the active flight display may continue to execute display functions and communication bus functions. Similarly, the autopilot function, the yaw damper function, the trim function, and the stall protections functions may continue to execute. However, the aircraft host may lose the functionality of the yaw damper function, the trim function, and the stall protections functions due to only one instance of each function being executed in the flight deck. Upon regaining functionality of the second flight display, the first flight display may be reconfigured from a stand-by mode to an active mode where the commands from the autopilot function, the yaw damper function, the trim function, and the stall protections functions are provided (with additional commands from the second flight display) to the actuator, causing the actuator to adjust the flight control surface or the throttle.

Figure 4A:
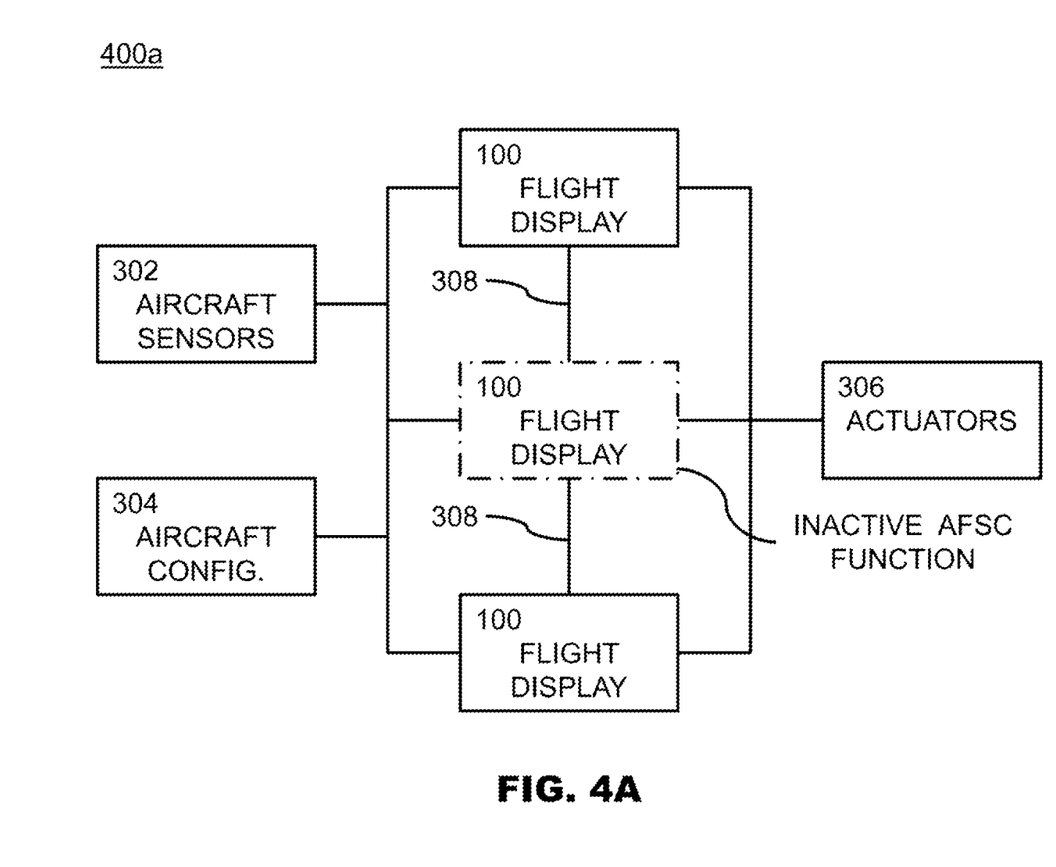
FIG. 4A depicts a simplified control diagram of an automatic flight control system with three flight displays where one of the three flight displays is not executing automatic flight control system functions, in accordance with one or more embodiments of the present disclosure.
Figure 4B:
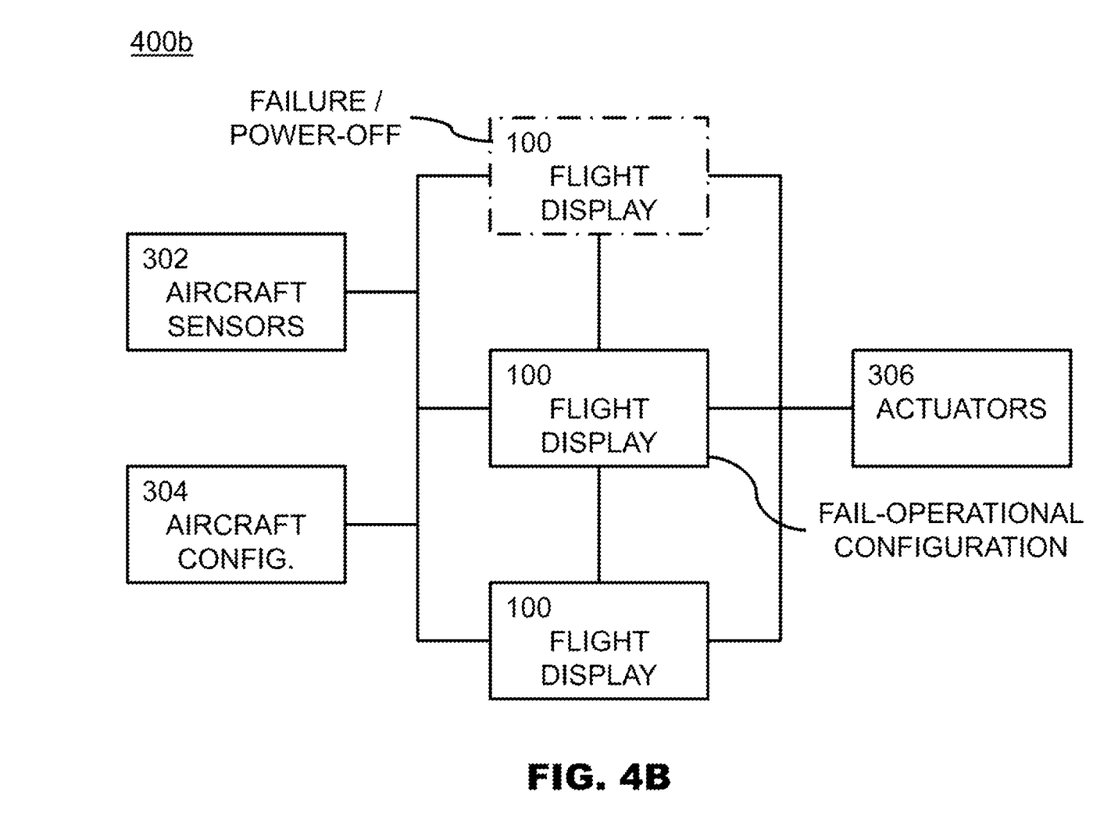
FIG. 4B depicts a simplified control diagram of an automatic flight control system with three flight displays where one of the three flight displays is operating in a fail-operational configuration upon detecting a failure or power-off of a second of the three flight displays, in accordance with one or more embodiments of the present disclosure.
Figure 4C:
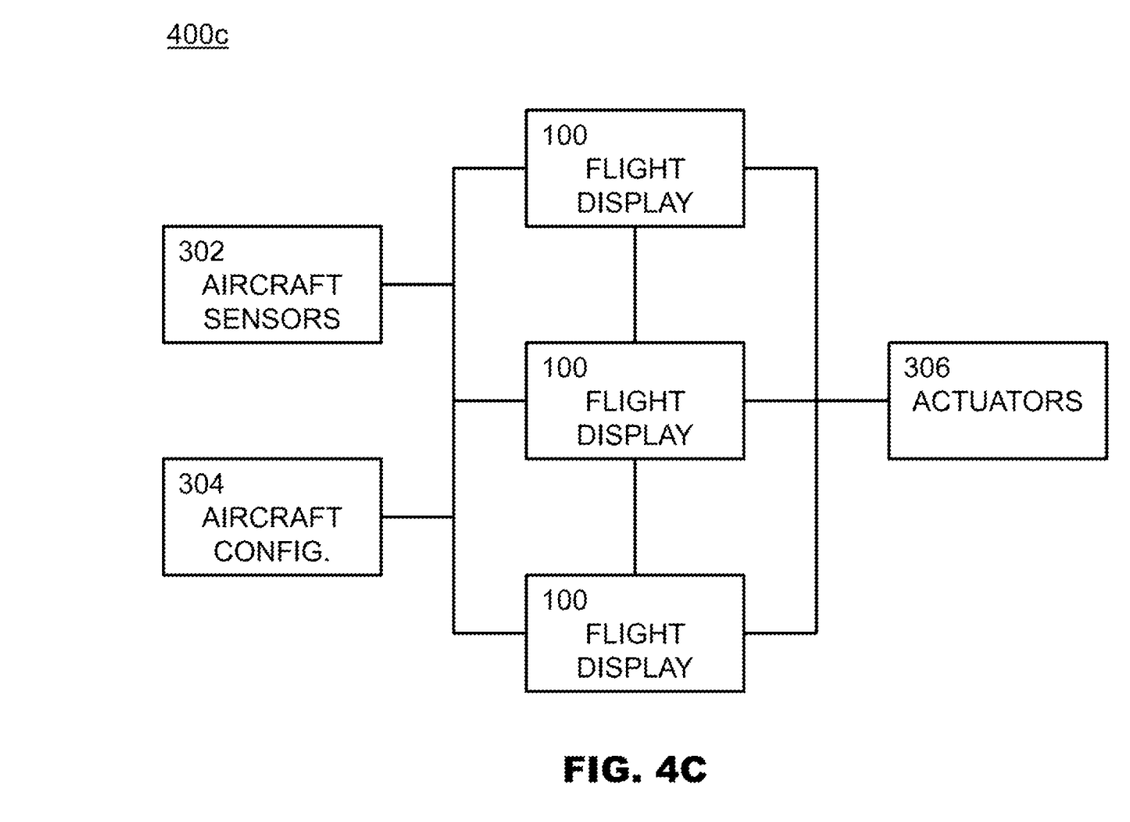
FIG. 4C depicts a simplified control diagram of an automatic flight control system with three flight displays each executing automatic flight control system functions with triple redundancy, in accordance with one or more embodiments of the present disclosure.

Referring now to FIGS. 4A-4C, a system 400 (e.g., system 400a, system 400b, system 400c) is described in accordance with one or more embodiments of the present disclosure. The system 400 may be similar to the system 200 and the system 300, with the exception that the system 400 includes three of the flight displays 100. As depicted, a middle flight display may be in an inactive AFCS function (or mode) and the two outside flight displays may be in an active AFCS function (or mode). The active AFCS function may include executing the AFCS functions by the processors. The inactive AFCS function may include no execution of the AFCS functions by the processors or otherwise a stand-by mode of the functions which run in the background but are not outputting commands to the actuator. The two outside flight displays may thus provide the required number of AFCS commands outputs without a need for the middle flight display. For example, the middle flight display may be a multi-function display and the two outside displays may be primary flight displays, where the MFD is disposed between the PFDs. The MFD may provide AFCS function commands upon detecting a failure of one of the PFDs.

In FIG. 4B, one of the two outside flight displays (e.g., a pilot PFD or a copilot PFD) has undergone a failure or has been powered-off. The middle flight display may detect the failure or power-off and switch to a fail-operational configuration. In the fail-operational configuration, the middle flight display may include displaying various imagery which was previously displayed on the failed or power-off flight display. The fail-operational configuration may also include reconfiguring the processors of the middle flight display to execute the AFCS functions. In this regard, the middle flight display may now send the commands to the actuators 306 together with the lower flight display. By providing the middle flight display as a backup, the system 400b may include modular redundancy for the AFCS functions. The recitation of top, middle, and lower is not intended to be limiting. In this regard, any two of the flight displays may host the AFCS functions with the remaining flight display serving as the secondary AFCS function host.

Referring specifically to FIG. 4C, each of the three flight displays may host the AFCS functions. By providing the instances of the AFCS commands, the system 300c may include triple modular redundancy. In some embodiments, one or more of the flight displays 100 may compare the command outputs by majority voting. In other embodiments, a data concentration unit (not depicted) performs the majority voting comparison.

Referring generally again to FIGS. 1A-4C.

It is contemplated that the various systems described herein may further include one or more IMA cabinet hosting one or more of the AFCS functions. The one or more IMA cabinet may host the AFCS functions together with one or more of the flight displays. It is further contemplated, the IMA cabinet and the flight displays may both host primary AFCS functions, with dual (e.g., 2-tuple), triple (e.g., 3-tuple), or n-tuple redundancy, where the n-tuple is based on the number of IMA cabinets and the number of flight displays acting as primary hosts for the AFCS functions. It is further contemplated that one or more IMA cabinets and/or one or more flight displays may serve as a secondary AFCS function host. In this regard, the IMA cabinet and/or the flight displays may host the AFCS functions and be reconfigured to output the commands to the actuator upon failure or power-off of the primary AFCS function host. It is further contemplated that one or more IMA cabinets and/or one or more flight displays may serve as a tertiary AFCS function host. In this regard, the IMA cabinet and/or the flight displays may host the AFCS functions and be reconfigured to output the commands to the actuator upon failure of the secondary AFCS function host. For example, four of more flight displays may host the AFCS functions, with a first two displays performing primary hosting, with a third display performing a secondary hosting (e.g., upon failure of either of the first two displays), and with a fourth display performing a tertiary hosting (e.g., upon detecting failure of the third display or the remaining first two displays) such that the four flight displays are configured with quadruple redundancy for the AFCS functions. As may be understood, a variety of permutations of AFCS function hosting among a select number of flights displays and a select number of IMA cabinets may provide a select level of redundancy for the AFCS functions. Furthermore, as additional flight display and/or IMA cabinets are added to the aircraft, additional levels of redundancy for the AFCS functions may be achieved. It is further contemplated that the flight displays may include more than one channel with capability for executing the AFCS functions (e.g., a dual channel redundancy, or more). In some instances the channels will be handled by dissimilar processors to further improve a redundancy of the AFCS functions.

From the above description, it is clear that the inventive concepts disclosed herein are well adapted to carry out the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A flight display comprising:
  a display screen configured to display a plurality of images representing avionics data;
  a physical network interface; and
  a plurality of processors communicatively coupled by an inter-processor communication bus, wherein one of the plurality of processors receives the avionics data and executes a display function causing the display screen to display the plurality of images, wherein at least some of the plurality of processors execute a plurality of automatic flight control system functions causing the flight display to send a command by way of the physical network interface, wherein each of the at least some of the plurality of processors separately execute at least one of the plurality of automatic flight control system functions;

wherein the flight display is a line replaceable unit configured to interface with a flight deck of an aircraft by the physical network interface; wherein the command causes at least one actuator communicatively coupled to the flight display by way of the physical network interface to adjust at least one of a flight control surface or a throttle of the aircraft;

wherein the plurality of automatic flight control system functions executed by the plurality of processors include a flight guidance function, an autopilot function, a yaw damper function, a trim function, an auto-throttle function, a flight control system monitor function, a stall warning function, and a stall protection function.

2. The flight display of claim 1, wherein the flight display is one of a primary flight display or a multi-function display.

3. The flight display of claim 1, wherein the plurality of processors are reconfigured to execute the plurality of automatic flight control system functions in response to detecting one of a failure or a power-off of one of a second flight display or a third flight display.

4. The flight display of claim 1, wherein the plurality of processors are reconfigured in a stand-by mode in response to detecting one of a failure or a power-off of a second flight display.

5. The flight display of claim 1, wherein the auto-throttle function is executed by a separate processor than the flight control system monitor function.

6. The flight display of claim 1, wherein the stall warning function is executed by a separate processor than the stall protection function.

7. The flight display of claim 1, wherein the stall protection function, the autopilot function, the yaw damper function, and the trim function are executed by a first processor of the plurality of processors.

8. The flight display of claim 7, wherein the flight guidance function and the auto-throttle function are executed by a second processor of the plurality of processors.

9. An automatic flight control system of an aircraft comprising:
at least two flight displays, wherein the at least two flight displays are each a line replaceable unit configured to interface with a flight deck of the aircraft by a physical network interface, each of the at least two flight displays including:
a display screen configured to display a plurality of images representing avionics data;
the physical network interface; and
a plurality of processors communicatively coupled by an inter-processor communication bus, wherein one of the plurality of processors receives the avionics data and executes a display function causing the display screen to display the plurality of images, wherein at least some of the plurality of processors execute a plurality of automatic flight control system functions causing the flight display to send a command by way of the physical network interface, wherein each of the at least some of the plurality of processors separately execute at least one of the plurality of automatic flight control system functions;

wherein the commands from the at least two flight displays cause at least one actuator communicatively coupled to the at least two flight displays by way of the physical network interfaces to adjust at least one of a flight control surface or a throttle of the aircraft;

wherein the plurality of automatic flight control system functions executed by the plurality of processors include a flight guidance function, an autopilot function, a yaw damper function, a trim function, an auto-throttle function, a flight control system monitor function, a stall warning function, and a stall protection function.

10. The automatic flight control system of claim 9, further comprising a flight control mode panel communicatively coupled to the at least two flight displays, wherein the plurality of automatic flight control system functions are reconfigurable based on a signal from the flight control mode panel.

11. The automatic flight control system of claim 9, wherein the at least two flight displays include a first flight display and a second flight display; wherein the first flight display is dynamically reconfigurable into a fail-soft configuration upon detecting a failure or a power-off of the second flight display;
wherein the fail-soft configuration includes reconfiguring the plurality of processors of the first flight display.

12. The automatic flight control system of claim 9, wherein the at least two flight displays include a first flight display, a second flight display, and a third flight display; wherein at least the third flight display is dynamically reconfigurable into a fail-operational configuration upon detecting a failure or a power-off of one of the first flight display or the second flight display, wherein the fail-operational configuration includes reconfiguring the at least some of the plurality of processors of the third flight display to provide command outputs from the plurality of automatic flight control system functions executed by the plurality of processors.

13. The automatic flight control system of claim 12, wherein the first flight display and the second flight display are a primary flight display; wherein the third flight display is a multi-function display disposed between the primary flight displays in the flight deck.

14. The automatic flight control system of claim 9, wherein the at least two flight displays include a first flight display, a second flight display, and a third flight display; wherein the first flight display, the second flight display, and the third flight display send the commands with triple modular redundancy.

* * * * *